(12) United States Patent
Wegmann et al.

(10) Patent No.: US 9,677,151 B2
(45) Date of Patent: Jun. 13, 2017

(54) PROCESS AND APPARATUS FOR VACUUM DISTILLATION OF HIGH-PURITY MAGNESIUM

(71) Applicant: ETH Zuerich, Zurich (CH)

(72) Inventors: Christian Wegmann, Schaffhausen (CH); Jörg Löffler, Greifensee (CH); Peter Uggowitzer, Ottenbach (CH); Minh Becker, Zurich (CH); Heinrich Feichtinger, Hinteregg (CH)

(73) Assignee: ETH ZUERICH, Zurich (CH)

( * ) Notice: Subject to any disclaimer, the term of this patent is extended or adjusted under 35 U.S.C. 154(b) by 140 days.

(21) Appl. No.: 14/370,186

(22) PCT Filed: Jan. 17, 2013

(86) PCT No.: PCT/EP2013/000131
§ 371 (c)(1),
(2) Date: Jul. 1, 2014

(87) PCT Pub. No.: WO2013/107644
PCT Pub. Date: Jul. 25, 2013

(65) Prior Publication Data
US 2015/0128765 A1    May 14, 2015

(30) Foreign Application Priority Data

Jan. 19, 2012   (EP) ..................................... 12000311

(51) Int. Cl.
*C22B 9/00* (2006.01)
*C22B 9/04* (2006.01)
(Continued)

(52) U.S. Cl.
CPC ................ *C22B 9/04* (2013.01); *C22B 9/006* (2013.01); *C22B 26/22* (2013.01); *F27B 5/04* (2013.01); *F27B 5/14* (2013.01); *F27B 5/18* (2013.01)

(58) Field of Classification Search
CPC . C22B 9/04; C22B 9/006; C22B 26/22; F27B 5/14; F27B 5/04; F27B 5/18
See application file for complete search history.

(56) References Cited

U.S. PATENT DOCUMENTS

| 4,407,488 A | 10/1983 | Wanetzky et al. |
| 4,708,190 A | 11/1987 | Hack |

(Continued)

FOREIGN PATENT DOCUMENTS

| CN | 1205647 A | 1/1999 |
| EP | 1335030 A1 | 8/2003 |

(Continued)

OTHER PUBLICATIONS

CN201380006118.9 First Office Action mailed Sep. 18, 2015.

*Primary Examiner* — George Wyszomierski
*Assistant Examiner* — Tima M McGuthry Banks
(74) *Attorney, Agent, or Firm* — Wagenknecht IP Law Group PC

(57) ABSTRACT

A process for producing high-purity magnesium by distillation at reduced pressure, which includes providing an apparatus having a retort formed from a material inert with respect to magnesium and an upper region defined by two vertically spaced level lines, a condensation vessel having a lower region and an upper region extending into the upper region of the retort, wherein the retort and condensation vessel are coupled to one another by an opening arranged in the upper region of the condensation vessel; providing a magnesium-containing metal melt to the retort at a level below the gap; and heating and maintaining the upper region of the retort at a temperature above the boiling point of magnesium to fill the retort with steam, thereby delivering a high purity melt into the condensation vessel via the opening.

5 Claims, 3 Drawing Sheets

(51) Int. Cl.
  *C22B 26/22*  (2006.01)
  *F27B 5/04*  (2006.01)
  *F27B 5/14*  (2006.01)
  *F27B 5/18*  (2006.01)

(56) References Cited

U.S. PATENT DOCUMENTS

| | | |
|---|---|---|
| 5,698,158 A | 12/1997 | Lam et al. |
| 6,533,990 B2 | 3/2003 | Popov et al. |
| 2004/0083854 A1* | 5/2004 | Tayama ............ C22B 9/04 75/595 |
| 2010/0206128 A1* | 8/2010 | Venaas ............ C22B 4/08 75/10.64 |

FOREIGN PATENT DOCUMENTS

| | | | | |
|---|---|---|---|---|
| EP | 1335032 A1 | 8/2003 | | |
| GB | 418789 A | * 10/1934 | ............ | C22B 26/22 |
| GB | 469760 A | * 7/1937 | ............ | C22B 26/22 |
| GB | 552254 A | * 3/1943 | | |
| JP | 58123840 A | 7/1983 | | |
| JP | S58123840 A | 7/1983 | | |
| JP | 3838717 | 10/2006 | | |
| KR | 605278 | 7/2006 | | |

* cited by examiner

1

PROCESS AND APPARATUS FOR VACUUM DISTILLATION OF HIGH-PURITY MAGNESIUM

CROSS-REFERENCE TO RELATED APPLICATIONS

This is a 371 national phase application of PCT/EP2013/000131 filed 17 Jan. 2013, which claims benefit of priority to European patent application no. EP 12000311.6, filed 19 Jan. 2012; the content of each is herein incorporated by reference in its entirety.

TECHNICAL FIELD

The invention relates to a process for producing high-purity magnesium by means of distillation at reduced pressure, and to apparatuses for performing the process.

BACKGROUND OF THE INVENTION

Magnesium has a low boiling point compared with most other metals and this is why many processes for the recovery of the raw metal or also for the recycling of magnesium from scrap metal are performed via the process step of vacuum distillation, since a magnesium that is largely purified from less volatile metals can be recovered in this way in a single step. If it is also sought to remove these volatile substances in order to produce high-purity magnesium, for example as is desirable for the semiconductor industry, vacuum distillation facilities having a plurality of condensation regions arranged in series are used, and therefore high-purity fractions, in which the impurities are merely in the ppm range, are also obtained from a number of fractions contaminated to a significant extent by other volatile metals, such as zinc and cadmium. Such a process is described in EP 1 335 030 A1, wherein the steam rising from a crucible containing an impure magnesium melt is conveyed via a multiplicity of successive deposition plates heated to decreasing temperatures and deposits on these plates in fractionated form.

The evaporation temperature of magnesium can be lowered with reduction of pressure until below the temperature of the melting point, and a particular feature of this metal is that its steam pressure even below the melting point is still so high that it is sufficient for a technically useful resublimation of high-purity magnesium crystals. Accordingly, most known vacuum distillation processes in accordance with the prior art for producing high-purity magnesium lead to the deposition of solid magnesium crystals.

Such magnesium crystals, in view of their low content of foreign elements, are indeed referred to as high-purity in the chemical sense, but the crystals have a high surface/volume ratio, and, when such crystals are remelted for the purpose of producing a semifinished product or near-net-shape articles, the oxide skins originally present on the surface of the magnesium crystals due to the high reactivity are distributed as non-metal inclusions in the melt and remain in the solidified material. Although they have only low concentration values, such inclusions, however, can adversely influence the corrosion behaviour of the otherwise high-purity magnesium, for example.

In accordance with EP 1 335 032 A1, there is a process in which an impure magnesium melt is evaporated in an evaporation vessel from high-purity graphite, wherein this steam then precipitates as liquid melt in a condensation crucible likewise consisting of graphite. Both crucibles are surrounded by a bell made of graphite, which prevents the magnesium steam from coming into contact with the cold wall of the vacuum retort surrounding the bell and condensing there. In order to bring both the evaporation crucible and the condensation crucible to the temperatures necessary for the process and simultaneously to keep the retort cold, two heating elements are present in the gap between the retort wall and the graphite bell. In particular due to the mounting of the heating elements within the vacuum region and the protection of the actual evaporation zone and condensation zone by the graphite bell, an increased structural outlay is created and in addition the inner volume has to be evacuated through leaks of the graphite bell, whereby magnesium steam can also pass externally at these points to the heating elements and the cold retort wall.

SUMMARY OF THE INVENTION

In contrast to most processes according to the prior art, the high-purity magnesium condenses in the liquid state in the process according to the invention, wherein a high-purity magnesium melt free from non-metal inclusions results, which forms a compact block following solidification, which is suitable for example in the sense of a semifinished product as starting material for shaping processes, without the material containing relatively large quantities of non-metal inclusions, which on the one hand can negatively influence the mechanical properties and on the other hand can negatively influence the corrosion behaviour.

In particular compared with the process cited further above in accordance with EP 1 335 032 A1, the process has the advantage that the retort can be heated externally, wherein the magnesium steam can come into contact with the inner wall of the retort without difficulty, since this wall is at such a high temperature that solid magnesium crystals cannot be deposited thereon. Likewise, the retort wall may also consist of a material that is soluble to a low extent in the magnesium melt, whereby the magnesium melt is contaminated. A condition of this, however, is that the retort must consist of a material that releases no volatile impurities into the magnesium steam.

Due to the possibility of arranging the heating system outside the retort and also allowing the contact with the hot inner wall of the retort, which only slightly contaminates the magnesium melt, a process is created that is particularly simple and cost-effective in terms of structure compared with the prior art.

BRIEF DESCRIPTION OF THE DRAWINGS

The process according to the invention will be explained hereinafter on the basis of three apparatus examples.

DETAILED DESCRIPTION

Figure 1:
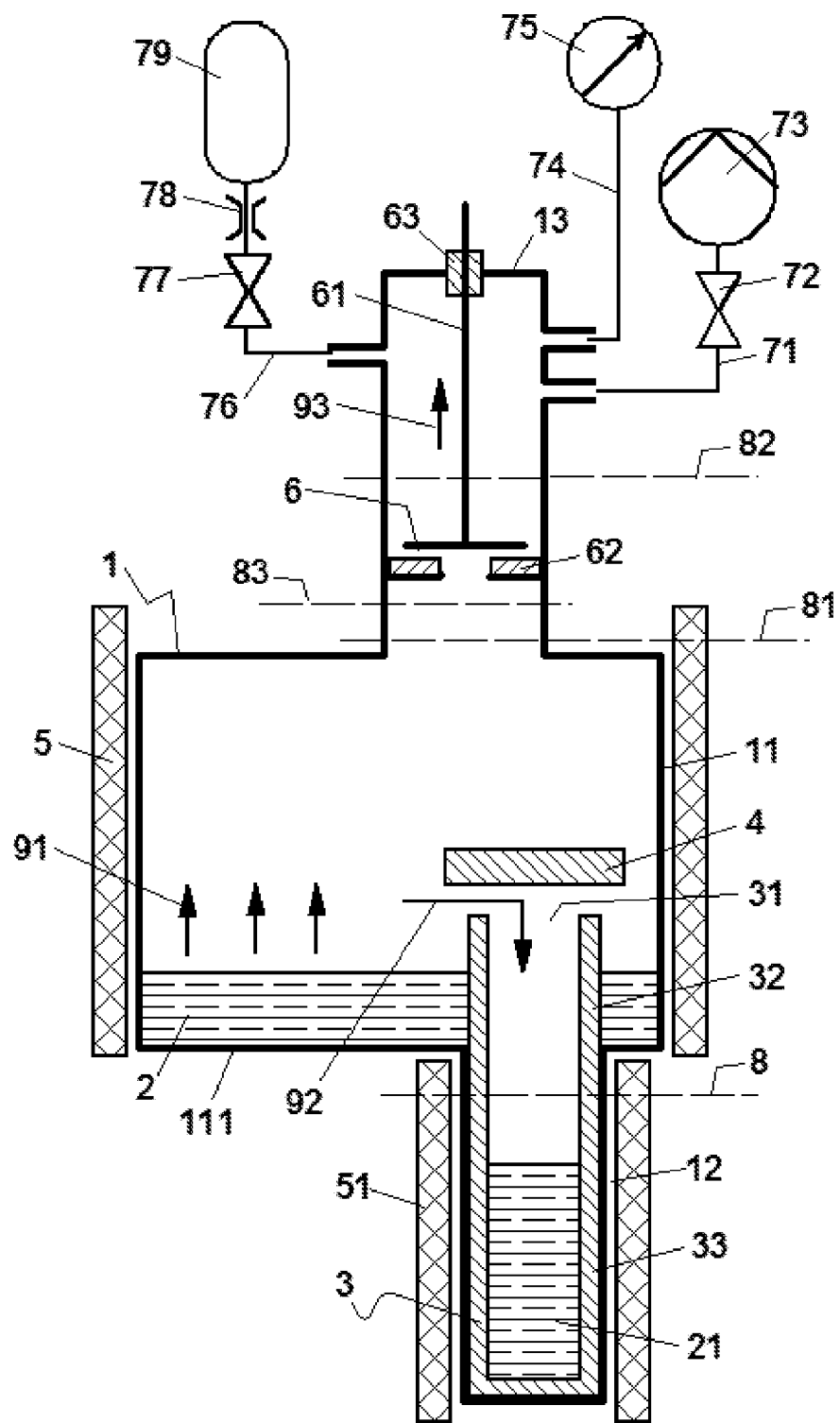
FIG. 1 shows a diagram of an apparatus according to the invention having the features essential to the invention in accordance with the teaching of the independent patent claim.

In FIG. 1 the elements of the first apparatus example are illustrated purposefully in geometrically simple form in order to emphasize the fact that the central inventive concept is based less on the specific form of these parts, but more on the functionality of these parts in conjunction with the temperature distribution within the retort. The starting material 2 in the form of a magnesium-containing metal melt is present together with the upper region 32 of a condensation vessel 3, preferably made of a high-purity graphite, in the upper region 11 of a retort 1 produced for example from stainless steel and having an arbitrary cross section, wherein a cylindrical cross section is most favourable in practice. The upper region 11 of the retort is brought by a heating element 5 surrounding it, for example in the form of a resistance furnace, to a temperature above the boiling point of the magnesium, within the limits of the level lines 8 and 81, and is then held constant, such that steam rises from the boiling magnesium-containing metal melt 2 in accordance with the arrows 91 and fills the interior of the upper region 11 of the retort 1, wherein it can also condense into liquid above the level line 81 and then flows back downwards again into the melt 2. Since stainless steel reacts slightly with liquid magnesium, the magnesium melt is contaminated by the alloy elements of the stainless steel upon contact therewith, however, since these elements have an irregularly lower steam pressure compared with magnesium, this contamination is not noticeable in the steam.

In order to prevent contaminated melt that drops from the region above the level line from reaching the opening 31 of the condensation vessel 3, this is protected by a cover 4, selectively also consisting of graphite, which conveys the impure magnesium back again into the melt 2. The cover 4 can be supported here directly on the upper region 32 of the condensation vessel 3 or can also be connected laterally or from above to the inner wall of the retort. In any case however, the fastening has to be formed such that the cover can be removed temporarily without difficulty in order to remove the solidified high-purity magnesium 21 from the condensation vessel 3.

The melt of the magnesium-containing starting material 2 is in direct contact with the outer surface of the condensation vessel 3 in the region 32 during the distillation process in the case of this apparatus example. Since, at the end of the distillation process, practically all starting material is evaporated, the condensation vessel is empty again. Any melt that has infiltrated into the gap between the region 31 of the condensation vessel and the region 12 of the retort is irrelevant here, since the condensation vessel does not necessarily have to be removed from the retort in order to remove the solidified magnesium. The steam infiltrating into the upper region 32 of the graphite crucible in accordance with the arrow 92 condenses below the level line 8 and collects as high-purity melt 21 in the lower region 33 of the graphite crucible. In order to prevent a boiling of this high-purity melt 21, a minimum pressure can be maintained within the retort by means of an inert gas, for example argon, which brings the boiling point of the magnesium above the temperature prevailing in the region 33. Here, the temperature profile in particular of the lower part 33 of the condensation vessel 3 is determined by a separately adjustable heating element 51. Via a barrier unit 6, for example in the form of a disc valve, which is pressed against a seat 62, for example in the form of a ceramic or graphite felt packing, via an externally actuatable push rod 61 that can be displaced through a vacuum feedthrough, the retort 1 can be connected to the supply chamber 13 upon movement of the push rod 61 in the direction of the arrow 93. Here, the barrier unit 6 with the valve disc and the seat 62 is present in the current example together with the upper region 11 of the retort 1 above the level line 81, that is to say at a temperature above the melting point of magnesium, such that solid magnesium cannot be deposited in the region of the barrier unit, whereby the function thereof is ensured.

The supply chamber 13, in its colder region above the level line 82, which symbolises the isotherm of the melting point, has a cover 14, preferably in the form of a removable vacuum flange, which has a number of connections besides the vacuum feedthrough 63. Here, one connection leads via a line 71 and a valve 72 to a vacuum pump 73, a further connection leads via a line 74 to a vacuum measuring instrument 75, and a third connection leads via a line 76, a valve 77 and a pressure and/or flow regulator 78 to an inert gas source 79, for example in the form of an argon pressure cylinder.

Once the retort 1 has been evacuated via the supply chamber 13 and then brought to the temperatures necessary for the distillation process, the barrier unit 6 is then opened only for a short period for the purpose of pressure adjustment and pressure correction so as to avoid excessive condensation of magnesium steam in the supply chamber 13. The duration of the closed periods is dependent here on the rise of pressure during the closed periods. In the ideal case, with sufficient degassing of highly gas-releasing parts, for example consisting of a graphite of low quality, or with use of parts made of high-purity graphite, the barrier unit 6 can remain closed for a long period of time and is only opened briefly at long intervals for the purpose of pressure monitoring. If the pressure in the meantime rises above an upper setpoint value, whereby the evaporation process of the starting material 2 is hindered, the retort 1 can be connected to the vacuum pump 73, by opening the valve 72, until the pressure has reduced again into the setpoint range. If, however, the pressure has fallen below the setpoint range, whereby there is a risk of evaporation of the high-purity magnesium melt present in the lower region 33 of the condensation vessel 3, the retort 1 is connected to the inert gas source 79 via the flow and/or pressure regulator 78 by opening the valve 77 until the pressure has risen again into the setpoint range. In both cases the barrier unit 6 is closed immediately once the setpoint pressure range has been reached in order to prevent excess infiltration of magnesium steam into the supply chamber 31.

As soon as the distillation process in accordance with the apparatus example of image 1 is finished and the retort 1 is cooled with its contents to room temperature, the retort can be opened, for example by a sawn cut along the dashed level line 83, whereupon the high-purity magnesium 21 present in the lower region 33 of the condensation vessel 3 can be removed from the crucible following removal of the cover 4, for example by turning the entire apparatus on its head. New starting material 2 can be introduced through the opening into the evaporation region 111 of the retort in a similar manner. Then, the retort 1 has to be joined together again to the supply chamber 13 in a vacuum-tight manner, for example by means of a welding or soldering process.

The heating elements 5 and 51 used in this example according to FIG. 1 are resistance heating elements controlled to constant temperatures, which are located at points of the retort relevant for the distillation process, that is to say for example in the region of the upper region of the retort contacted by the melt of the starting material in order to adjust the temperature of the evaporation process, and in the lower region 33 of the condensation vessel 3 and the immediate environment of the barrier unit 6 in order to check whether the temperature in these regions is above the melting point of magnesium. Instead of the resistance heating elements 5 and 51, two induction coils or a single induction coil wound in accordance with the temperature distribution can of course also be provided, which heat the retort and/or the materials present therein.

Figure 2:
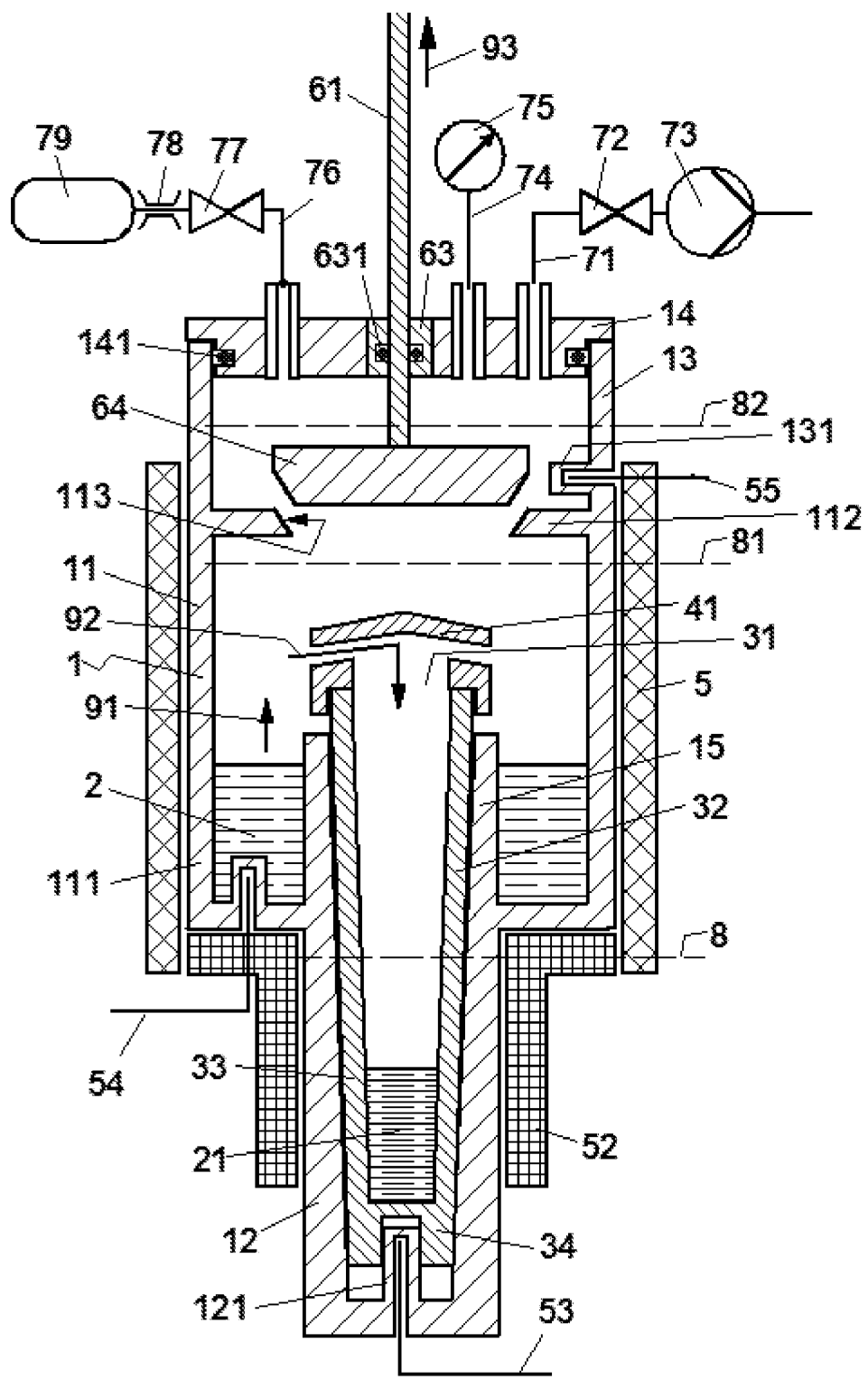
FIG. 2 shows a cross section through an exemplary apparatus for producing high-purity magnesium.

FIG. 2 shows an example of an apparatus according to the invention that is particularly suitable for rational operation under industrial conditions, wherein like numbers denote parts having the same function as in FIG. 1. Here, the retort 1 is welded together as central symmetrical tubular body to an upper region 11 of larger diameter and to a lower region 33 of smaller diameter consisting of a superalloy, wherein the lower region 12 extends in a tubular extension 15 into the upper region 11 of the retort. The melt of the starting material 2 is thus present in an annular crucible, of which the side walls are formed by the wall region 111 of the upper region 11 of the retort 1 and the tubular extension 15, such that the melt does not come into contact with the outer wall of the condensation vessel.

In this example of the apparatus according to the invention, the tubular extension 15 and the lower region 33 of the retort have, internally, an inner wall with continuous conicity, such that the condensation vessel 3 in the form of a crucible consisting of high-purity graphite, which has a corresponding conicity of the outer lateral surface, does not provide a gap for the infiltration of condensing magnesium melt. In contrast to the apparatus example according to FIG. 1, where the condensation vessel 3 has a cylindrical inner bore, since the solidified pure magnesium block can generally be easily removed as a result of the large shrinkage, the condensation vessel 3 in the present apparatus example also has a conical inner face, such that the high-purity magnesium block 21 can be removed even more easily following solidification.

The opening 31 in the condensation vessel 3 is covered by a roof-shaped graphite cover 41 with radial bores leading upwardly at an incline for the entry of the magnesium steam according to arrow 92. The cover 41 can also be formed in a manner more complex than that in the figure, for example by also placing lateral screens in front of the radial bores, such that no splashes of the fiercely boiling melt of the starting material 2 can be flung directly into the condensation vessel 3.

The barrier unit is configured here in the form of a conical metal stopper 64, which seals with respect to the conical seat 113 of the intermediate wall 112. This sealing process is also assisted by the fact that liquid magnesium condenses in the seal gap between the metal stopper 64 and the seat 113 and prevents the passage of magnesium steam. The push rod 61, by means of which the barrier unit can be closed in the direction of the arrow 92, is actuated externally through a vacuum feedthrough 63 with ring seal 631, wherein this can be performed manually or automatically via a control pulse. Instead of the ring seal 631, the push rod 61 could also be introduced through the flange 14 into the supply chamber 13 in a sealing manner, for example by means of a metal bellow. The flange 14 is sealed in the example by means of a ring seal 141 with respect to the cylindrical supply chamber 13.

The lines 71, 74 and 76 lead, as in the previous example, to a vacuum pump 73, a vacuum measuring instrument 75 and selectively to an inert gas source, however electrically actuatable valves 72 and 77 are used here, and therefore, besides the barrier unit 64 for connecting the retort 1 to the supply chamber 13, the pressure can also be reduced and increased automatically in the direction of a setpoint pressure range in the sense described with the previous example within the scope of a control circuit.

In contrast to the previous example, only the upper region 11 of the retort 1 is heated in this apparatus with a heating element 5, for example in the form of a tubular resistance heating furnace, whereas the lower region 33 is surrounded by an insulation layer 52, which is dimensioned such that the heat passing from the upper region by means of thermal conduction through the retort wall 12 and the wall 32 of the condensation vessel as well as the downwardly travelling heat caused by the condensation of the magnesium steam, in combination with the cooling effect of the region of the retort wall 12 not insulated at the bottom, holds the temperature of the condensed high-purity magnesium melt in the desired range between the melting temperature and the boiling temperature. The temperature profile within the retort 1 can also be changed as desired within a certain range by shifting the retort in the vertical direction with respect to the furnace and insulation.

The temperature of the high-purity magnesium melt 21 can be controlled via a temperature sensor 53, for example a jacket thermocouple of type K or J, which extends via a protuberance of the wall 12 into the foot of the lower region 32 of the condensation vessel 3, and, where applicable, can be controlled such that it does not fall below the melting point of the magnesium. The moment at which the last residue of the starting material is evaporated can be determined by means of a second temperature sensor 54, for example likewise a jacket thermocouple, which measures the temperature within the melt of the starting material 2 via a protuberance of the wall of the region 111 of the retort. At this moment, where the cooling effect of the evaporation process ceases, there is specifically a sudden increase of the temperature of this thermocouple. The third temperature sensor 55 sits tightly above the barrier unit 64 in a protuberance of the lower region of the wall of the supply chamber 13 and makes it possible to check whether this barrier unit is above the temperature of the melting point of magnesium, since only then is the correct function of this barrier unit ensured. At the end of a furnace cycle, that is to say prior to the cooling of the facility, the barrier unit 64 should be lifted from the seat face 113 so that it is not soldered thereto.

In the first example of an apparatus, a variant of the heating system with two independent heating elements is presented, but in the present second example the upper retort region is heated by means of a heating element 5, wherein the lower region 33 surrounded by the thermal insulation is also heated indirectly by the upper region, wherein the heat introduced by the condensation of the magnesium steam also contributes. In the sense of the process according to the invention, apparatuses having a plurality of furnaces arranged in succession in the vertical direction are also possible, such that the upper and the lower part of the retort and additionally also the region of the barrier unit 6 can be controlled separately in each case to their specific temperature by means of a dedicated heating element.

Figure 3:
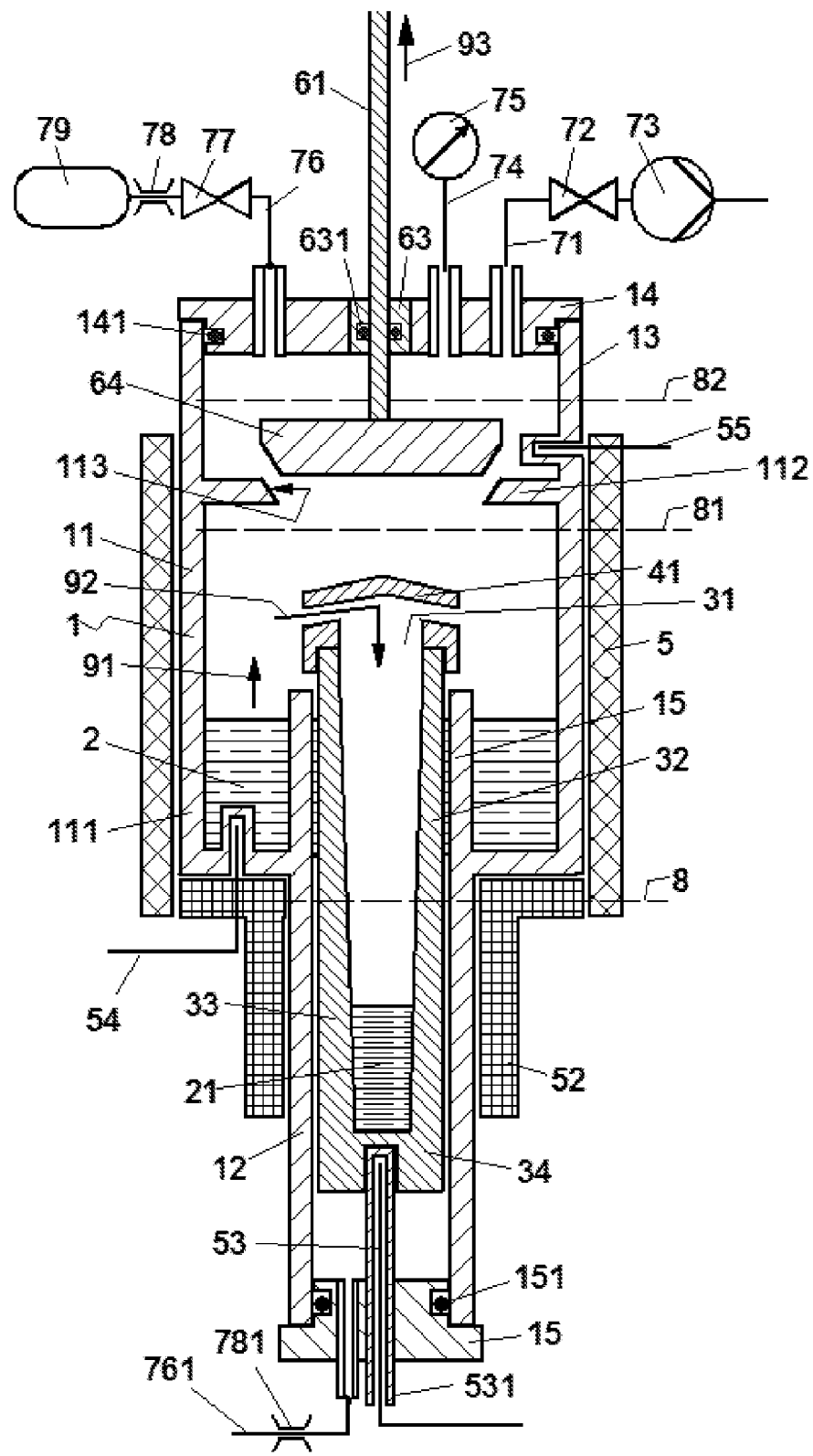
FIG. 3 shows a cross section through a further exemplary apparatus for producing high-purity magnesium.

FIG. 3 shows a third example of an apparatus according to the invention, which is largely similar to the apparatus shown in FIG. 2. In contrast to this apparatus shown there, however, the condensation vessel 3 in the present example has a cylindrical outer face, whereby an annular gap is produced between this outer face and the inner lateral surface of the lower region 33 of the retort 1. By removing a selectively water-cooled flange 15, the crucible can be removed downwardly from the retort. In order to prevent magnesium steam from infiltrating into this gap and condensing into liquid in its lower region or into solid below the crucible base 34, this flange 15 has a feed line 761 with a flow regulation element 781, through which gas originating from an inert gas source can be introduced into the space beneath the base 34 of the condensation vessel 3. The quantity of the fed inert gas is such here that its speed in the gap outside the condensation vessel 3 is so high that it exceeds the diffusion rate of the magnesium steam potentially ready for migration in the opposite direction. As a result of this addition of inert gas, the pressure rise within the retort is indeed accelerated, whereby the intervals within which the barrier unit 64 has to be opened for the purpose of pressure control and regulation are somewhat shorter, however this reduction is insignificant, since only small quantities of inert gas are necessary to keep the gap free.

The figures do not show the control circuits and mechanisms that are necessary to keep constant the temperatures and the pressure of the apparatuses, since their functioning, apart from the accuracy necessary for the execution of the process, is insignificant for the execution of the process.

LIST OF REFERENCE SIGNS 1 retort, generally
11 upper region of retort
111 region of 11 in contact with starting material
112 intermediate wall of 11 and 13
113 conical seat for 64 in 112
114 protuberance of the retort wall as protection for temperature sensor 54
12 lower tapered region of retort
121 protuberance of the supply chamber wall as protection for temperature sensor 53
13 supply chamber
131 protuberance of the retort wall as protection for temperature sensor 55
14 vacuum flange
141 ring seal
15 vacuum flange
151 ring seal
2 magnesium-containing metal starting melt
21 high-purity magnesium melt
3 condensation vessel, generally
31 opening in condensation crucible
32 upper zone of condensation crucible
33 lower zone of condensation crucible
4 cover
41 cover with lateral openings
5 heating system for region 11
51 heating system for region 12
52 insulation for region 12
53 temperature sensor in base zone of condensation vessel
531 protective pipe for temperature sensor
54 temperature sensor for evaporation zone
55 temperature sensor for region of barrier unit 64
6 barrier unit
61 push rod of barrier unit
62 seal seat for barrier unit
63 vacuum feedthrough for push rod
631 ring seal
64 barrier unit with conical seat
71 connection line to vacuum pump
72 barrier unit to vacuum pump
73 vacuum pump
74 connection line to vacuum measuring instrument
75 vacuum measuring instrument
76 connection line to barrier unit
761 connection line to flow regulator for inert gas
77 barrier unit
78 flow regulator for inert gas
781 flow regulator for inert gas
79 inert gas source
8 lower level limit for temperature range above boiling point
81 upper level limit for temperature range above boiling point
82 upper level limit for temperature range above melting point
83 level line of possible sawn cut
91 arrow, steam generation
92 arrow, steam entry into condensation vessel
93 arrow, lifting direction of barrier unit 6

What is claimed is:

1. A process for producing high-purity magnesium by distillation at reduced pressure, the process comprising:
   providing an apparatus comprising:
      a retort formed from a material inert with respect to magnesium and comprising an upper region positioned between two vertically spaced level lines,
      a condensation vessel comprising a lower region and an upper region extending into the upper region of the retort, wherein the upper region of the retort and condensation vessel are coupled to one another by an opening arranged in the upper region of the condensation vessel,
   providing a magnesium-containing metal melt to the retort at a level below the opening; and
   heating and maintaining the upper region of the retort at a temperature above the boiling point of magnesium to fill the retort with steam, thereby delivering a high purity melt into the condensation vessel via the opening.

2. The process of claim 1, wherein the upper region of the retort is heated by a heating element that surrounds the upper region.

3. The process of claim 1, further comprising pressurizing the retort to increase the boiling temperature of the magnesium above a temperature in the lower region of the condensation vessel.

4. The process of claim 1, further comprising evacuating the retort via a supply chamber and adjusting the temperature of the retort to a distillation temperature.

5. The process of claim 4, further comprising monitoring the pressure of the supply chamber.

* * * * *